W. S. HAMLIN.
CARPET-STRETCHER.
No. 175,450. Patented March 28, 1876.
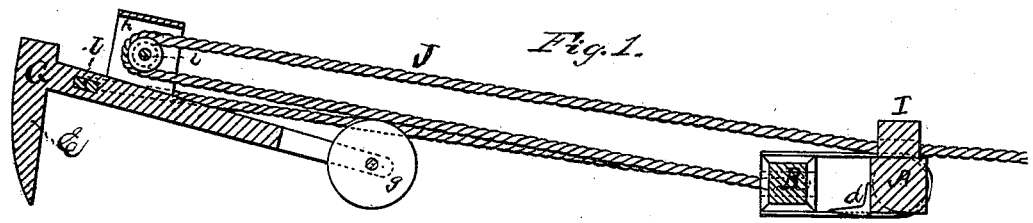
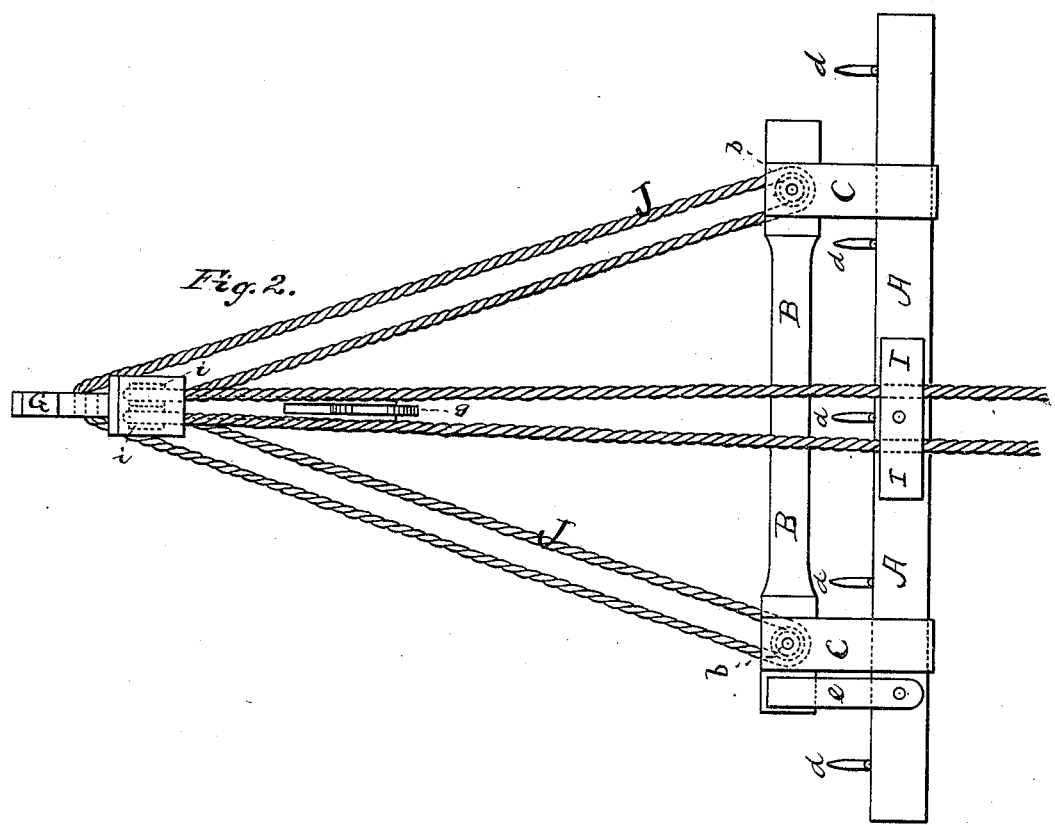
WITNESSES
Mary T. Uttey.
Emory H. Bates.
INVENTOR,
William S. Hamlin,
Chipman Hosmer & Co.
ATTORNEYS.

UNITED STATES PATENT OFFICE.

WILLIAM S. HAMLIN, OF BUCHANAN, MICHIGAN.

IMPROVEMENT IN CARPET-STRETCHERS.

Specification forming part of Letters Patent No. 175,450, dated March 28, 1876; application filed December 11, 1875.

*To all whom it may concern:*

Be it known that I, WILLIAM S. HAMLIN, of Buchanan, in the county of Berrien and State of Michigan, have invented a new and valuable Improvement in Carpet-Stretchers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my carpet-stretcher, and Fig. 2 is a plan view thereof.

This invention has relation to improvements in carpet-stretchers; and it consists in the construction and novel arrangement of a horizontal bar of wood or metal, to the inner side of which are rigidly secured hooks, in combination with a second horizontal bar of wood or metal, connected to the first bar by means of metallic loops, which bar at each end is provided with slots, wherein are journaled small pulleys, all as hereinafter more fully shown and described.

It also consists in combining with a carpet-stretcher a metallic dog, slotted at its inner end, wherein is journaled a metallic roller, and provided at its outer end with a sharp point, designed to be driven on the floor, in combination with lugs, arranged on the upper portion of the dog, wherein are journaled one or more pulleys, all as hereinafter shown and described.

In the annexed drawings, A designates a horizontal bar of wood or metal, having rounded surfaces near its ends for the purpose hereinafter described. The inner face of this bar is provided with hooks, $d$, rigidly secured thereto, the outer ends of which are pointed and project beyond the said bar for a purpose hereinafter described. B designates a second bar, arranged parallel to bar A, the ends of which are horizontally slotted for the purpose of receiving pulleys $b$ therein. C designates loops, passing around the rounded surfaces of bar A and pivoted to the second bar B by means of a bolt passing through the ends of the loops through the slots, and the pulleys $b$ arranged therein, by which means the said pulleys are secured for a purpose hereinafter described. The object of the rounded surfaces on the bar A is to allow this bar to be turned in loops so that the hooks $d$, arranged on its inner face, may be conveniently thrust into the carpet. When the hooks are thus engaged, and in order that they may not loose their hold by the rotation of the bar back to its former position, I have provided a stay-piece, $e$, pivoted at one end to bar A, the free end of which is designed to be passed over the loop passing around said bar, which will hold it firmly in that position. G designates a metallic dog, consisting of a bar of metal, provided near its outer end with a perforation, $l$, for a purpose hereinafter described. The outer end of this dog is provided with a sharp metallic point, E, which is designed to be driven in the floor near the wash-board of the room. The inner end of this dog is bifurcated, as shown at $f$, for the purpose of affording bearings for a metallic roller, $g$, for a purpose hereinafter explained. On the upper portion of dog G I have provided raised lugs $h$, wherein are journaled one or more pulleys, $i$, for a purpose hereinafter described.

The manner of operating my improved carpet-stretcher is as follows: The ends of a cord, J, are first passed over and around the pulleys $i$, above described; then separating backward they extend around pulleys $b$ arranged in the ends of the bar D; thence they are curved forward and are passed through the perforation $l$ made near the end of the dog, and secured against displacement therefrom by means of the knots made in their ends, or by any other suitable means.

The cords being arranged as above described, the manner of stretching the carpet is as follows: The pointed end E of the dog G is driven into the floor next to the wash-board, and the hooks $d$ of bar A are thrust down into the carpet behind the dog G, when, by drawing upon the cord J while standing behind the bar A, the carpet will be drawn up in a roll between the dog and the bar B. The end of the cord is then belayed around a cleat, I, on bar A, and the carpet will be held fast. The edge of the carpet, being drawn close to the wall, may then be securely tacked to the floor, when the machine may be removed and put in another place.

It will be found in practice that the roller or wheel g, journaled in bifurcation, is a great convenience, and will save a great deal of labor in the securing of the carpet, for, when the carpet is in a roll between the bar B and the dog G, it can be drawn very easily up to the wall by this roller, which allows it to pass under it.

What I claim as new, and desire to secure by Letters Patent, is—

1. The combination, with the bar A, having hooks d, of the bar B, loops C, and pulleys b, substantially as specified.

2. In combination with the stretcher-bar A and bar B looped thereto, and having pulleys b, the hooked metallic dog G, having roller g and pulleys i, and operating cord J, substantially as specified.

In testimony that I claim the above I have hereunto subscribed my name in the presence of two witnesses.

WILLIAM S. HAMLIN.

Witnesses:
FRANK BLACKMAN,
DANIEL A. WAGNER.